No. 685,515. Patented Oct. 29, 1901.
C. W. HUNT.
CONVEYER.
(Application filed Dec. 3, 1900.)
(No Model.)
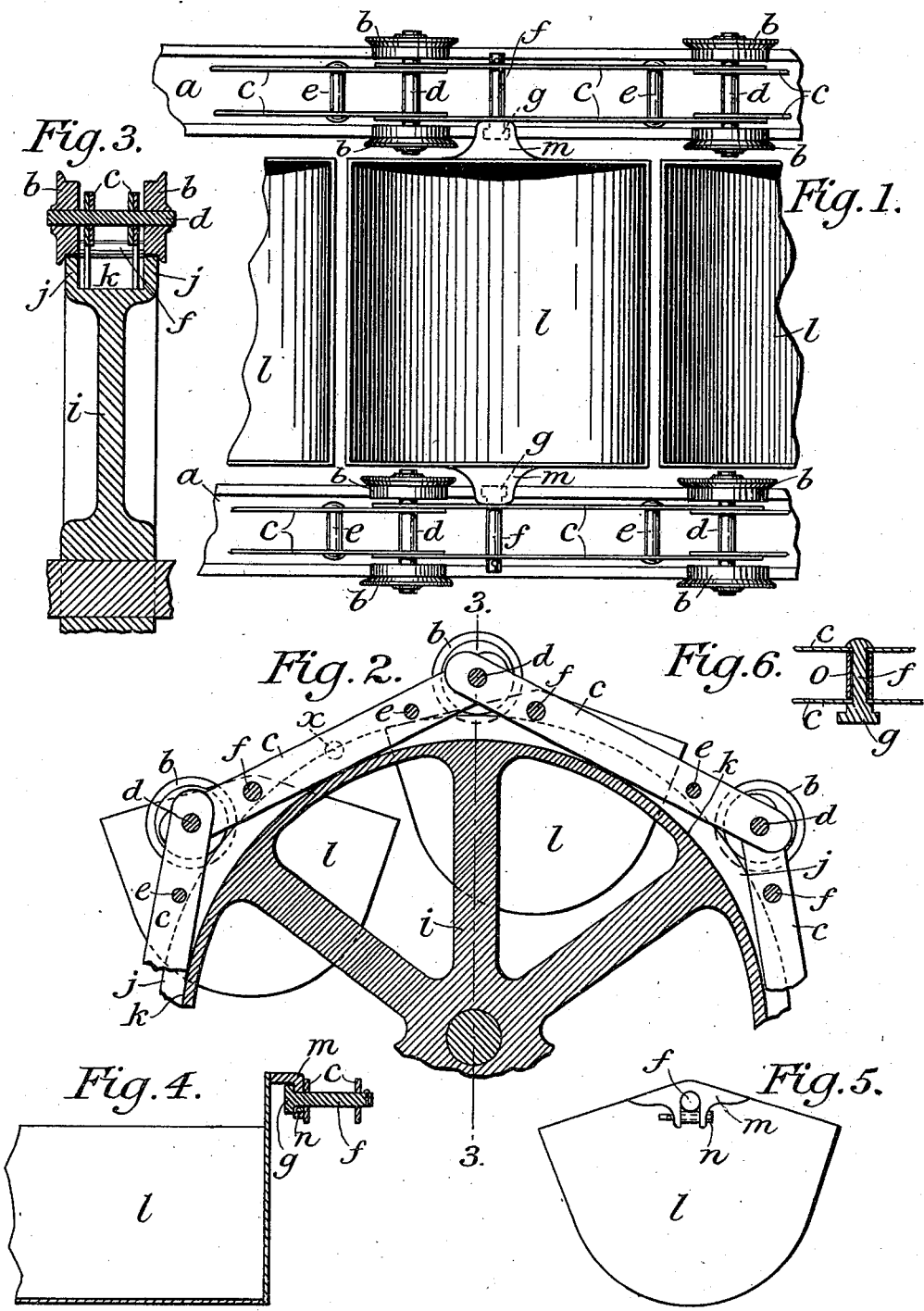

UNITED STATES PATENT OFFICE.

CHARLES W. HUNT, OF WEST NEW BRIGHTON, NEW YORK.

CONVEYER.

SPECIFICATION forming part of Letters Patent No. 685,515, dated October 29, 1901.

Application filed December 3, 1900. Serial No. 38,393. (No model.)

*To all whom it may concern:*

Be it known that I, CHARLES W. HUNT, a citizen of the United States, residing in West New Brighton, borough of Richmond, city of New York, State of New York, have invented certain new and useful Improvements in Conveyers, of which the following is a specification, reference being had to the accompanying drawings, forming a part hereof.

This invention relates to endless-chain conveyers, which are commonly employed for carrying coal and other substances and which usually comprise two chains composed of rigid links and rollers, adapted to run upon suitable tracks, and buckets which are hung from such links. At points where the direction of movement is changed large carrying-wheels are generally placed to receive and support the chains by a contact with the links thereof, the tracks being omitted at such points. With the usual arrangement of the several parts of the chains it is necessary to employ carrying-wheels of very large diameter. Otherwise there is danger of bending or breaking the component parts of the chains.

It is the principal object of this invention to so combine the several coöperating parts as to permit the use of carrying-wheels of much smaller diameter than usual, thereby requiring less space for the operation of the conveyer and saving weight and expense.

A further object, incidental to the principal object, is to improve the means whereby the buckets are hung to the chains, so that the bearings of the buckets shall be protected from dust and dirt and the free movement of the buckets with respect to chains while dumping and returning to position be insured.

The invention will be more fully described hereinafter with reference to the accompanying drawings, in which it is illustrated, and in which—

Figure 1 is a plan view of a portion of a conveyer which embodies the invention. Fig. 2 is a detail view in section, showing the relation of the chains and buckets to one of the conveyer-wheels above mentioned. Fig. 3 is a section on the plane indicated by the line 3 3 of Fig. 2. Fig. 4 is a detail view in section of one of the buckets and the devices for supporting the same from the chain. Fig. 5 is an end view of the bucket shown in Fig. 4. Fig. 6 is a detail view in section, showing a slightly-different form of the chain and pin upon which a bucket is hung at one end.

In the drawings tracks $a$, of any suitable form, are represented as adapted to afford a suitable bearing and guide for the wheels $b$ of the chains. The links $c$ of each chain are represented as pivoted upon the short shafts or axles $d$, which receive the wheels or rollers $b$, suitable spacing-rods $e$ being provided for the links, if desired. Secured in each link or pair of links is a pin or rod $f$, upon which the corresponding end of one of the buckets is supported, such pin preferably having at its inner end a head $g$. The pins $f$ are not placed, as usual, at points midway between the ends of the links, but at points relatively near the ends of such links. The purpose of this combination of the parts is illustrated clearly in Fig. 2, wherein it will be seen that the carrying-wheel $i$, which is placed at a point where the direction of movement is changed, receives upon its side flanges $j$ the wheels $b$ of the chains, while the links $c$ between their ends drop into the annular groove $k$ between the side flanges. If the supporting pins or rods $f$ were placed midway, as indicated at $x$, between the ends of the links, it will be obvious that a carrying-wheel of very large diameter would be required in order to prevent such pins from resting in contact with the flanges of the carrying-wheel as the links pass over the same. By placing such pins $f$ relatively near the ends of the links, as shown in Figs. 1 and 2, it is possible to employ carrying-wheels of much smaller diameter without permitting such undesirable contact of the pins with the flanges of the carrying-wheels, while the chain-wheels $b$ rest upon such flanges, and the links $c$, if desired, are also supported at their middle points on the bottom of the groove $k$.

In order to secure the proper clearance between the carrying-wheels and the buckets and in order to protect from dust and dirt the bearings of the buckets upon the pins $f$, each bucket $l$ is provided at each end with an overhanging depending bearing $m$, which may be formed integral with or be suitably secured to the end of the bucket and engages the pin $f$ within its head $g$. Preferably each bearing $m$ opens downward to straddle the pin $f$ and is closed to prevent accidental disengagement of the bucket by a removable pin $n$. By such means the bucket can be disengaged easily from the chain whenever desired.

In the modification shown in Fig. 6 a spacing-sleeve $o$ is applied to the pin $f$ between the links $c$.

I claim as my invention—

1. In a conveyer, the combination with the chain-wheels, shafts or axles therefor and links pivoted upon said shafts or axles, of a carrying-wheel having side flanges to support said chain-wheels and to receive the links between them, and bucket-supporting pins or rods secured in said links relatively near the ends thereof, substantially as shown and described.

2. In a conveyer, the combination with the links, rollers, and bucket-supporting pins, having heads at their inner ends, of buckets having at each end an overhanging, depending bearing to engage said pins and to cover the headed ends thereof, substantially as shown and described.

This specification signed and witnessed this 24th day of November, A. D. 1900.

CHARLES W. HUNT.

In presence of—
ANTHONY N. JESBERA,
LUCIUS E. VARNEY.